US012097533B2

(12) United States Patent
Kline et al.

(10) Patent No.: US 12,097,533 B2
(45) Date of Patent: Sep. 24, 2024

(54) TRANSMITTER CHARGE SHARING IN A DIFFERENTIAL ULTRASONIC TRANSDUCER

(71) Applicant: InvenSense, Inc., San Jose, CA (US)

(72) Inventors: Mitchell H. Kline, Owensboro, KY (US); Richard J. Przybyla, Piedmont, CA (US)

(73) Assignee: InvenSense, Inc., San Jose, CA (US)

( * ) Notice: Subject to any disclaimer, the term of this patent is extended or adjusted under 35 U.S.C. 154(b) by 813 days.

(21) Appl. No.: 17/308,816

(22) Filed: May 5, 2021

(65) Prior Publication Data

US 2022/0355339 A1 Nov. 10, 2022

(51) Int. Cl.
*B06B 1/06* (2006.01)
*B06B 1/02* (2006.01)

(52) U.S. Cl.
CPC .......... *B06B 1/0207* (2013.01); *B06B 1/0603* (2013.01)

(58) Field of Classification Search
CPC ............................ B06B 1/0603; H10N 30/802
USPC ......................................... 310/317, 322, 334
See application file for complete search history.

(56) References Cited

U.S. PATENT DOCUMENTS 5,969,621 A * 10/1999 Getman ................ B06B 1/0692 310/369
7,579,753 B2 * 8/2009 Fazzio .................. H04R 17/02 310/366

* cited by examiner

*Primary Examiner* — Derek J Rosenau

(57) ABSTRACT

An ultrasonic transducer device comprises a controller and a differential piezoelectric micromachined ultrasonic transducer with a membrane later, a bottom electrode layer, a piezoelectric layer, and a top electrode layer comprising a first electrode with a positive voltage to displacement coefficient and a second electrode with a negative voltage to displacement coefficient. During a first period, the controller electrically decouples a first output of a first driver from the first electrode, electrically decouples a second output of a second driver from the second electrode, and electrically couples the first and second electrodes to equalize charge between them. During a second period, the controller electrically decouples the first and second electrodes, electrically couples the first output with the first electrode, and electrically couples the second output with the second electrode; where waveforms on the first and second outputs during the second time period are out of phase with one another.

21 Claims, 9 Drawing Sheets

$t_1$, $t_3$, AND $t_5$ = SWITCHES MOVE WITH ARROW DIRECTION $t_2$ AND $t_4$ = SWITCHES MOVE OPPOSITE ARROW DIRECTION

TRANSMITTER CHARGE SHARING IN A DIFFERENTIAL ULTRASONIC TRANSDUCER

BACKGROUND

A variety of devices exist which utilize sonic sensors (e.g., sonic emitters and receivers, or sonic transducers). By way of example, and not of limitation, a device may utilize one or more sonic sensors to track the location of the device in space, to detect the presence of objects in the environment of the device, and/or to avoid objects in the environment of the device. Such sonic sensors include transmitters which transmit sonic signals, receivers which receive sonic signals, and transducers which both transmit sonic signals and receive sonic signals. Piezoelectric Micromachined Ultrasonic Transducers (PMUTs), which may be air-coupled, are one type of sonic transducer, which operates in the ultrasonic range, and can be used for a large variety of sensing applications such as, but not limited to: distance estimation, communication, virtual reality controller tracking, presence detection, and object avoidance for drones or other machines, etc. In some instances, a sonic transmitter or transducer may use a differential drive technique when transmitting.

BRIEF DESCRIPTION OF DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

DESCRIPTION OF EMBODIMENTS

Figure 1A:
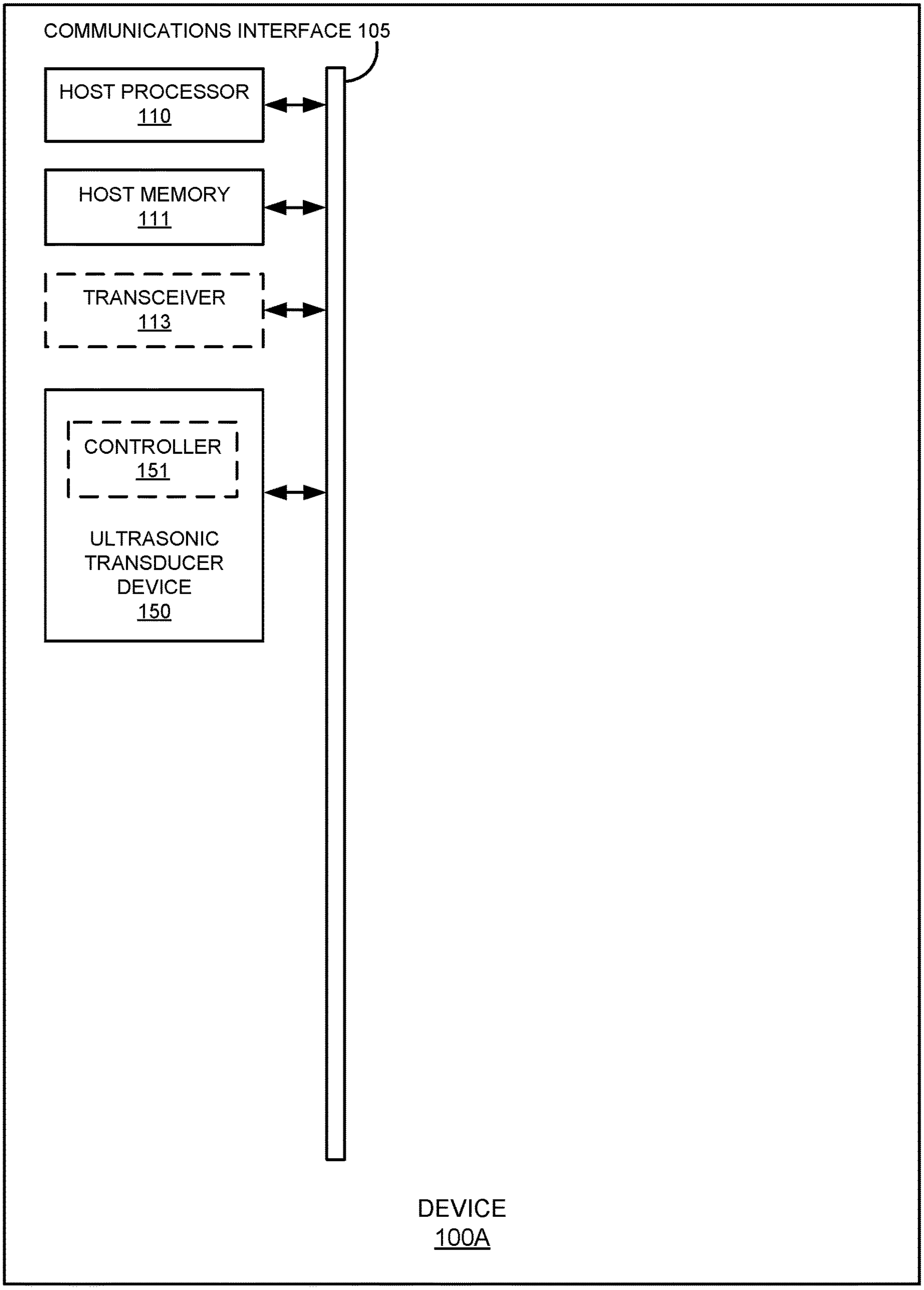
FIGS. 1A and 1B show example block diagrams of some aspects of a device, in accordance with various embodiments.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope of the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Overview of Discussion

Ultrasonic transducers (to include air-coupled Piezoelectric Micromachined Ultrasonic Transducers (PMUTs)), ultrasonic transmitters, and ultrasonic receivers can be used for a large variety of sensing applications. Conventionally, however, the application field for such ultrasonic sensing devices is limited by numerous factors to include their size, transmission capabilities, and their power consumption. Any significant reduction in the overall size, the size of a component, the amount of surface area or "real estate" required in silicon or the overall power consumed could open new applications or improve efficiency of existing applications.

The transmitter charge sharing technology described herein utilizes a selectable switch which can electrically couple and decouple differential electrodes of a differential sonic transducer or transmitter. By selectively timing the opening and closing of the switch during the driving of the sonic transducer/transducer, the differential electrodes can be briefly coupled together to share or equalize the charge across them rather than dumping or shunting unneeded charge to ground. As differential electrodes in a differential sonic transducer/transmitter are, by design, equal or nearly equal in size, they have very similar capacitances (typically varying by 10% or less) when viewed as plates of a capacitor. In a case where the sizes of electrodes are not closely matched, power savings using the charge sharing techniques described herein may be diminished. Having very similar capacitances, allows the differential electrodes to become fairly equalized in charge when they are coupled together electrically. In this manner, during differential drive, a differential electrode which is about to be driven low can be partially discharged into the other of the differential electrodes which is about to be driven high. This charge sharing technique provides about half the charge needed to drive a differential electrode to its high state, thus obviating the need to supply this half of the charge from an application specific integrated circuit (ASIC) or other drive circuitry/components coupled with the differential sonic transducer/transmitter.

The transmitter charge sharing technology described herein presents improvements to the transmit function of a sonic transducer or sonic transmitter, and more particularly reduces the power and charge needed to be supplied to a differential sonic transducer/transmitter (by approximately one half) by recycling about half of the charge on the transmitter electrodes of the transducer/transmitter through the described charge sharing. This reduction in power and charge needs reduces the physical size required for power handling and charge supplying components on an ASIC or other integrated circuit, thus reducing the area or "real estate" used by such components on the substrate of the ASIC/integrated circuit versus a conventional (non-charge sharing) approach. The combination of charge-sharing and the reduced size of these power handling and charge producing components permits an ASIC/integrated circuit to be designed which can operate a differential sonic transducer/ transmitter at a relatively high voltage differential (e.g., a 40 volt differential), while using zero or minimal off-ASIC components. That is, in some embodiments, off-ASIC transmitters, capacitors, and charge pumps are not required and the size of the ASIC can still be kept very small. This enables a very small package for an overall device which includes an ASIC and a paired ultrasonic transducer. In-turn, this small package size and reduced power requirements for the device permits an increased number of uses in applications which need one or both of smaller size or reduced power consumption; or, put differently, provides nearly double the ultrasonic output for the same power consumption of a device operated without the techniques for charge sharing described herein.

Discussion begins with a description of notation and nomenclature. Discussion then shifts to description of some block diagrams of example components of some example devices which may operate a differential sonic emitter or transducer in the manner described herein. The device may be any type of device which utilizes a differential sonic transducer or differential sonic transmitter. For example, any device which uses conventional differential PMUTs could utilize the transmitter charge sharing techniques described herein. An example depiction of a differential sonic sensing device (in the form of an ASIC coupled with a differential PMUT) is described. Utilization of an example transmitter for transmitting signals with the charge sharing technique is described. Operation of an example ultrasonic sensing device for transmitting signals using the charge sharing technique is then described. Finally, operation of various components of an ultrasonic transducer device, with the charge sharing technique, is described in conjunction with description of a method of operating a differential piezoelectric micromachined ultrasonic transducer comprising a first electrode with a positive voltage to displacement coefficient and a second electrode with a negative voltage to displacement coefficient.

NOTATION AND NOMENCLATURE

Some portions of the detailed descriptions which follow are presented in terms of procedures, logic blocks, processes, modules and other symbolic representations of operations on data bits within a computer memory. These descriptions and representations are the means used by those skilled in the data processing arts to most effectively convey the substance of their work to others skilled in the art. In the present application, a procedure, logic block, process, module, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device/component.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "electrically coupling," "electrically decoupling," "generating," "processing," "decoupling," "coupling," "switching," "opening," "closing," accomplishing one or more actions during a time period, or the like, may refer to the actions and processes of an electronic device or component such as: a host processor, a sensor processing unit, a sensor processor, a controller or other processor, a memory, some combination thereof, or the like; and/or a component such as a switch or an emitter, receiver, or transducer operating under control of a host processor, a sensor processing unit, a sensor processor, a controller or other processor, or the like. The electronic device/component manipulates and transforms data represented as physical (electronic and/or magnetic) quantities within the registers and memories into other data similarly represented as physical quantities within memories or registers or other such information storage, transmission, processing, or display components.

Embodiments described herein may be discussed in the general context of processor-executable instructions residing on some form of non-transitory processor-readable medium, such as program modules or logic, executed by one or more computers, processors, or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example electronic device(s) described herein may include components other than those shown, including well-known components.

The techniques described herein may be implemented in hardware, or a combination of hardware with firmware and/or software, unless specifically described as being implemented in a specific manner. Any features described as modules or components may also be implemented together in an integrated logic device or separately as discrete but interoperable logic devices. If implemented in software, the techniques may be realized at least in part by a non-transitory computer/processor-readable storage medium comprising computer/processor-readable instructions that, when executed, cause a processor and/or other components of a computer or electronic device to perform one or more of the methods described herein. The non-transitory processor-readable data storage medium may form part of a computer program product, which may include packaging materials.

The non-transitory processor-readable storage medium (also referred to as a non-transitory computer-readable storage medium) may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as host processor(s) or core(s) thereof, digital signal processors (DSPs), general purpose microprocessors, application specific integrated circuits (ASICs), application specific instruction set processors (ASIPs), field programmable gate arrays (FPGAs), sensor processors, microcontrollers, or other equivalent integrated or discrete logic circuitry. The term "processor" or the term "controller" as used herein may refer to any of the foregoing structures, any other structure suitable for implementation of the techniques described herein, or a combination of such structures. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a plurality of microprocessors, one or more microprocessors in conjunction with an ASIC or DSP, or any other such configuration or suitable combination of processors.

In various example embodiments discussed herein, a chip is defined to include at least one substrate typically formed from a semiconductor material. A single chip may for example be formed from multiple substrates, where the substrates are mechanically bonded to preserve the functionality. Multiple chip (or multi-chip) includes at least two substrates, wherein the two substrates are electrically connected, but do not require mechanical bonding.

A package provides electrical connection between the bond pads on the chip (or for example a multi-chip module) to a metal lead that can be soldered to a printed circuit board (or PCB). A package typically comprises a substrate and a cover. An Integrated Circuit (IC) substrate may refer to a silicon substrate with electrical circuits, typically CMOS (complementary metal-oxide-semiconductor) circuits but others are possible and anticipated. A MEMS substrate provides mechanical support for the MEMS structure(s). The MEMS structural layer is attached to the MEMS substrate. The MEMS substrate is also referred to as handle substrate or handle wafer. In some embodiments, the handle substrate serves as a cap to the MEMS structure.

Some embodiments may, for example, comprise an ultrsonic transducer device. This ultrasonic transducer device may operate in any suitable ultrasonic range. In some embodiments, the ultrasonic transducer device may be or include a differential electrode ultrasonic transducer which may be an air coupled PMUT. In some embodiments, the ultrasonic transducer device may include a digital signal processor (DSP) or other controller or processor which may be disposed as a part of an ASIC which may be integrated into the same package as the differential ultrasonic transducer.

Example Device

Figure 1B:
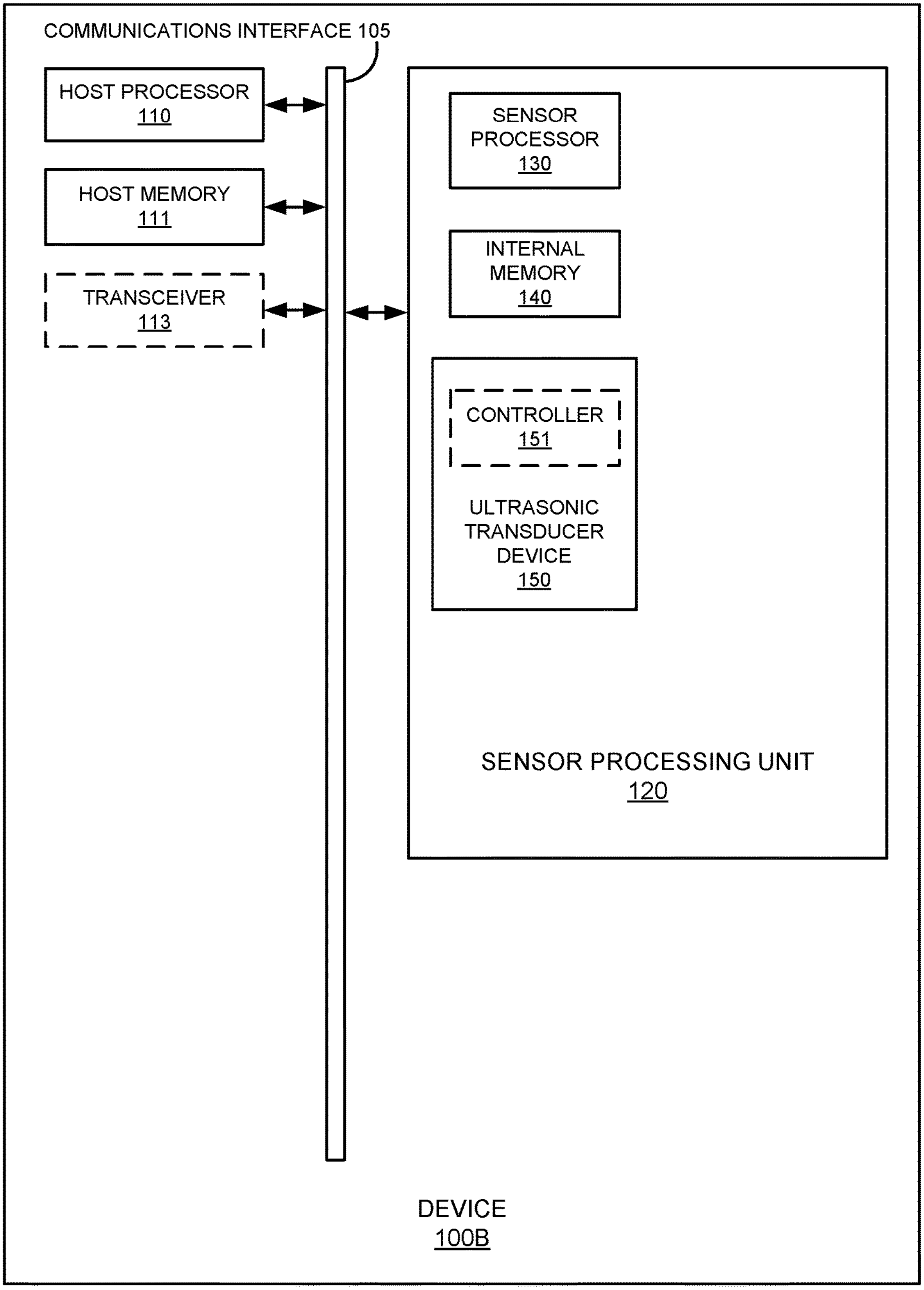

FIGS. 1A and 1B show some example components of a device 100 (e.g., 100A and 100B) which utilizes an ultrasonic transducer device 150, according to various embodiments. Some examples of a device 100 may include, but are not limited to: remote controlled vehicles, virtual reality remotes, a telepresence robot, an electric scooter, an electric wheelchair, a wheeled delivery robot, a flying drone operating near a surface or about to land on or take off from a surface, a wheeled delivery vehicle, an automobile, an autonomous mobile device, a floor vacuum, a smart phone, a tablet computer, a "smart doorbell" or a "smart lock" which uses ultrasonic proximity detection to awaken a camera, and a robotic cleaning appliance. By way of example, and not of limitation, the device 100 may utilize one or more ultrasonic transducer devices 150 to track the location of the device 100 in space, to detect the presence of objects in the environment of the device 100, to sense the absences of objects in the environment of device 100, to characterize objects sensed in the environment of device 100, and/or to avoid objects in the environment of the device 100.

FIG. 1A shows a block diagram of components of an example device 100A, in accordance with various aspects of the present disclosure. As shown, example device 100A comprises a communications interface 105, a host processor 110, host memory 111, and at least one ultrasonic transducer device 150. In some embodiments, device 100 may additionally include one or more of a transceiver 113 and one or more motion sensors or other types of sensors. Some embodiments may include sensors used to detect motion, position, or environmental context; some examples of these sensors may include, but are not limited to, infrared sensors, cameras, microphones, and global navigation satellite system sensors (i.e., a global positioning system receiver). As depicted in FIG. 1A, included components are communicatively coupled with one another, such as, via communications interface 105.

The host processor 110 may, for example, be configured to perform the various computations and operations involved with the general function of device 100. Host processor 110 can be one or more microprocessors, central processing units (CPUs), DSPs, general purpose microprocessors, ASICs, ASIPs, FPGAs or other processors which run software programs or applications, which may be stored in host memory 111, associated with the general and conventional functions and capabilities of device 100.

Communications interface 105 may be any suitable bus or interface, such as a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, or other equivalent and may include a plurality of communications interfaces. Communications interface 105 may facilitate communication between SPU 120 and one or more of host processor 110, host memory 111, transceiver 113, ultrasonic transducer device 150, and/or other included components.

Host memory 111 may comprise programs, modules, applications, or other data for use by host processor 110. In some embodiments, host memory 111 may also hold information that that is received from or provided to sensor processing unit 120 (see e.g., FIG. 1B). Host memory 111 can be any suitable type of memory, including but not limited to electronic memory (e.g., read only memory (ROM), random access memory (RAM), or other electronic memory).

Transceiver 113, when included, may be one or more of a wired or wireless transceiver which facilitates receipt of data at device 100 from an external transmission source and transmission of data from device 100 to an external recipient. By way of example, and not of limitation, in various embodiments, transceiver 113 comprises one or more of: a cellular transceiver, a wireless local area network transceiver (e.g., a transceiver compliant with one or more Institute of Electrical and Electronics Engineers (IEEE) 802.11 specifications for wireless local area network communication), a wireless personal area network transceiver (e.g., a transceiver compliant with one or more IEEE 802.15 specifications (or the like) for wireless personal area network communication), and a wired a serial transceiver (e.g., a universal serial bus for wired communication).

Ultrasonic transducer device 150 includes a differential ultrasonic transducer similar to or of the type described herein (e.g., uses differential transmitter drive) and is configured to emit and receive ultrasonic signals. In some embodiments, ultrasonic transducer device 150 may include a controller 151 for controlling the operation of the differential ultrasonic transducer and/or other components of ultrasonic transducer device 150. The controller 151 may be any suitable controller, many types of which have been described here. For example, controller 151 may turn amplifiers on or off, turn transmitters on or off, and/or operate selectable switches to electrically couple or decouple certain components during transmitting or during receiving and/or couple a transmitter electrodes to a driver, to ground, etc. Controller 151 may enable different modes of operation (e.g., transmitting, receiving, or continuous operation). Additionally, or alternatively, in some embodiments, one or more aspects of the operation of ultrasonic transducer device 150, or components thereof, may be controlled by an external component such as sensor processor 130 and/or host processor 110; for example, an external device may select times to transmit and/or receive with ultrasonic transducer device 150.

FIG. 1B shows a block diagram of components of an example device 100B, in accordance with various aspects of the present disclosure. Device 100B is similar to device 100A except that it includes a sensor processing unit (SPU) 120 in which ultrasonic transducer device 150 is disposed. SPU 120, when included, comprises: a sensor processor 130; an internal memory 140; and at least one ultrasonic transducer device 150. In some embodiments, SPU 120 may additionally include one or more motion sensors and/or one or more other sensors such a light sensor, infrared sensor, GNSS sensor, microphone, etc. In various embodiments, SPU 120 or a portion thereof, such as sensor processor 130, is communicatively coupled with host processor 110, host memory 111, and other components of device 100 through communications interface 105 or other well-known means. SPU 120 may also comprise one or more communications interfaces (not shown) similar to communications interface 105 and used for communications among one or more components within SPU 120.

Sensor processor 130 can be one or more microprocessors, CPUs, DSPs, general purpose microprocessors, ASICs, ASIPs, FPGAs or other processors that run software programs, which may be stored in memory such as internal memory 140 (or elsewhere), associated with the functions of SPU 120. In some embodiments, one or more of the functions described as being performed by sensor processor 130 may be shared with or performed in whole or in part by another processor of a device 100, such as host processor 110.

Internal memory 140 can be any suitable type of memory, including but not limited to electronic memory (e.g., read only memory (ROM), random access memory (RAM), or other electronic memory). Internal memory 140 may store algorithms, routines, or other instructions for instructing sensor processor 130 on the processing of data output by one or more of ultrasonic transducer device 150 and/or other sensors. In some embodiments, internal memory 140 may store one or more modules which may be algorithms that execute on sensor processor 130 to perform a specific function. Some examples of modules may include, but are not limited to: statistical processing modules, motion processing modules, object detection modules, and/or decision-making modules.

Ultrasonic transducer device 150, as previously described, includes a differential ultrasonic transducer of or similar to the type described herein and is configured to emit and receive ultrasonic signals. In some embodiments, ultrasonic transducer device 150 may include a controller 151 for controlling the operation of the differential ultrasonic transducer and/or other components of ultrasonic transducer device 150. The controller 151 may be any suitable controller and operates in the manner previously described.

Additionally, or alternatively, in some embodiments, one or more aspects of the operation of electrodes ultrasonic transducer device 150 or components thereof may be controlled by an external component such as sensor processor 130 and/or host processor 110. Ultrasonic transducer device 150 is communicatively coupled, in some embodiments, with sensor processor 130 by a communications interface, bus, or other well-known communication means.

Example Differential Piezoelectric Transducer

Figure 2A:
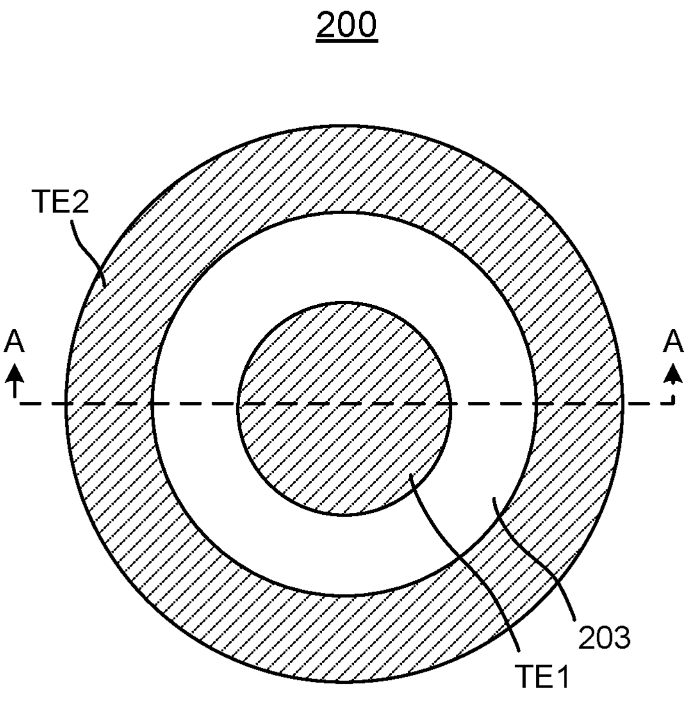
FIG. 2A shows a top plan view of a differential electrode transducer, in accordance with various embodiments.

FIG. 2A shows a top plan view of a differential electrode transducer 200, in accordance with various embodiments. In some embodiments, differential piezoelectric transducer 200 is an ultrasonic transducer and operates in the ultrasonic range. In some embodiments, differential transducer 200 is a Piezoelectric Micromachined Ultrasonic Transducer (PMUT), which may be an air-coupled PMUT. In some air coupled ultrasonic transducer embodiments, for example, differential piezoelectric transducer 200 operates in the 60 to 200 kHz range. In some air coupled ultrasonic transducer embodiments, for example, differential piezoelectric transducer 200 operates in the 40 to 400 kHz range; where higher frequencies may be used for sensing objects that are very near to a transducer. In other embodiments of an ultrasonic transducer which is not air coupled (i.e., the transducer is coupled to other media such as liquids, human flesh, or solids), different operating frequency ranges are possible. In a first example, in some medical device embodiments such as for ultrasound probes, an ultrasonic transducer as described herein may operate in the 1-10 MHz range. In a second example, in some fingerprint sensing embodiments, an ultrasonic transducer as described herein may operate in the 10-60 MHz range. Section line A-A shows the position and direction of a side sectional view illustrated in FIG. 2B.

With reference to FIG. 2A, the top view illustrates that transducer 200 is formed in a circular shape, however other shapes may be utilized. Some non-limiting examples of other shapes include: square, rectangular, hexagonal, and ellipse.

Figure 2B:
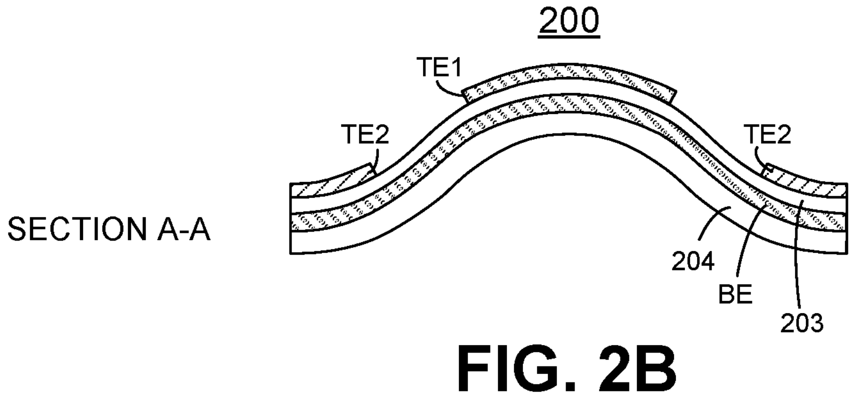
FIG. 2B shows a sectional side elevational view of the differential electrode transducer of FIG. 2A, in accordance with various embodiments.

FIG. 2B shows a sectional side elevational view A-A of the differential transducer 200 of FIG. 2A, in accordance with various embodiments.

With reference to FIGS. 2A and 2B, differential piezoelectric transducer 200 includes: a top electrode layer, TE; a bottom electrode layer, BE; a membrane layer 204, and a piezoelectric layer 203. As will be described, the depicted order of the layers is just one example of their ordering;

other orders of these layers may be utilized in some embodiments so long as the piezoelectric material is disposed between the TE layer and the BE layer. In some embodiments, other layers such as protective layers, filler layers, and/or electrically insulating layers may be included. These other layers have not been depicted in order to improve clarity. It should be appreciated that membrane layer 204 moves up and down (relative to FIG. 2B) at a desired frequency to produce sound through the displacement of membrane layer 204, and that in FIG. 2B membrane layer 204 is depicted in a "displaced up" position of the transducer.

With continued reference to FIG. 2A, the BE layer comprises conductive material disposed above and coupled with the membrane layer 204.

It should be appreciated that electrical traces are required to be coupled to the electrodes to route various signals and/or provide various couplings (such as to another electrode, to ground, etc.), however in the interest of clarity these traces are not illustrated. Any suitable routing may be used for such these traces.

With continued reference to FIGS. 2A and 2B, a piezoelectric layer 203 is disposed above and coupled with the bottom electrode layer, and a top electrode layer TE comprised of conductive material is disposed above and coupled with the piezoelectric layer 203. The top electrode layer, TE, comprises a center electrode TE1 that is disposed above a center portion of the membrane layer 204. The top electrode layer, TE, also comprises an outer electrode TE2 that is spaced apart, outward, from the center electrode TE1. In a circular embodiment, as depicted in FIG. 2A, the outer electrode TE2 is spaced radially outward, apart from the center electrode TEL Outer electrode TE2 is disposed such that it is spaced apart, away from the center of the membrane layer and around (i.e., surrounding) center electrode TE1. In FIG. 2A, outer electrode TE2 forms circular ring around center electrode TE1 which is circular. However, in other transducer shapes (e.g., square, hexagonal, rectangular, oval) the outer electrode as well as the center electrode may have other shapes (e.g., square, hexagonal, rectangular, oval) and the outer electrode forms a perimeter or periphery which is spaced apart and outward from the center electrode. In some embodiments, the center electrode and outer electrode may each be divided into an equal number of segments. For example, each of the center electrode and the outer electrode may be divided into two segments, three segments, four segments, five segments six segments, etc.

In some embodiments, center electrode TE1 is equal or substantially equal (e.g., within manufacturing tolerances of a few percent) in surface area to outer electrode TE2. That is, in some embodiments the plan view surface area of TE1=the surface area of TE2.

In some embodiments the center electrode TE1 and outer electrode TE2 are positioned on the piezoelectric layer 203 based on a curvature of the piezoelectric layer 203 when it is displaced up or down (shown displaced up in FIG. 2B). That is, they are arranged such that the curvature of the center electrode TE1 is opposite of the curvature of the outer electrode TE2 when transducer 200 is fully displaced up or fully displaced down. That is, one of the center electrode and the outer electrode is inside the deflection point of the displaced piezoelectric layer 203 while the other is outside of a deflection point of the displaced piezoelectric layer 203.

With continued reference to FIGS. 2A and 2B, one way to mathematically describe the shapes of the top electrode layer (TE1, TE2) with respect to the piezoelectric layer 203 is that the top electrode layer is disposed above and coupled with the piezoelectric layer 203 and comprises a first electrode (center electrode segments TE1) disposed above a section of the membrane layer 204 in which the Laplacian of the out-of-plane displacement in the piezoelectric layer 203 has a positive sign in a given displaced shape when operating at a desired eigenmode of the membrane layer, while a second electrode (outer electrode TE2) spaced radially apart from the first electrode (TE1), is disposed above a section of the membrane layer 204 in which the Laplacian of the out-of-plane displacement in the piezoelectric layer 203 has a negative sign in the same given displaced shape when operating at a desired eigenmode of the membrane layer. Another way to mathematically describe the shapes of the top electrode layer (TE1, TE2) with respect to the piezoelectric layer 203 is that the top electrode layer is disposed above and coupled with the piezoelectric layer 203 and comprises a first electrode (center electrode TE1) disposed above a section of the membrane layer 204, in which the sum of the normal components of the in-plane strain in the piezoelectric layer 203 has a positive sign in a given displaced shape; while a second electrode (outer electrode segments TE2) spaced apart (radially apart in the depicted embodiment) from the first electrode (TE1), is disposed above a section of the membrane layer 204 in which the sum of the normal components of the in-plane strain in the piezoelectric layer 203 has a negative sign in the same given displaced shape. Put yet another way, the differential nature of the transmitter electrodes (TE1 and TE2) means that a first electrode of the differential transmitter electrodes (e.g., center electrode TE1) has a positive voltage to displacement coefficient, while the second electrode of the differential transmitter electrodes (e.g., outer electrode TE2) has a negative voltage to displacement coefficient.

With reference to FIG. 2B, differential transducer 200 is shown with a curvature which occurs as the transducer 200 moves during operation. As depicted, in some instances during upward deflection of the piezoelectric layer 203, when center electrode TE1 presents a concave surface disposed toward membrane layer 204; at the same time, outer electrode TE2 presents a convex surface oriented toward membrane layer 204. Similarly, in other instances during downward deflection of the piezoelectric layer 203 (not depicted), when center electrode TE1 presents a convex surface disposed toward membrane layer 204; at the same time, outer electrode TE2 presents a concave surface oriented toward membrane layer 204. These concave and convex curvatures and orientations are due to the shape of the deflected piezoelectric layer 203 as it moves in response to an applied signal.

With reference to FIG. 2B, in some embodiments, an additional electrode (not depicted) can be added below membrane layer 204. In such embodiments, the additional electrode can be grounded and/or electrically isolated from bottom electrode layer BE and used as a shield to reduce interference.

Although described herein as an ultrasonic transducer, the principles of the differential piezoelectric transducer 200 illustrated in FIGS. 2A and 2B may be utilized with transducers operating in other frequency ranges (e.g., human audible or infrasound). Further, the principles may be applied to sonic transmitters, not just to sonic transducers.

Operation of the Example Differential Electrode PMUT

Figure 3:
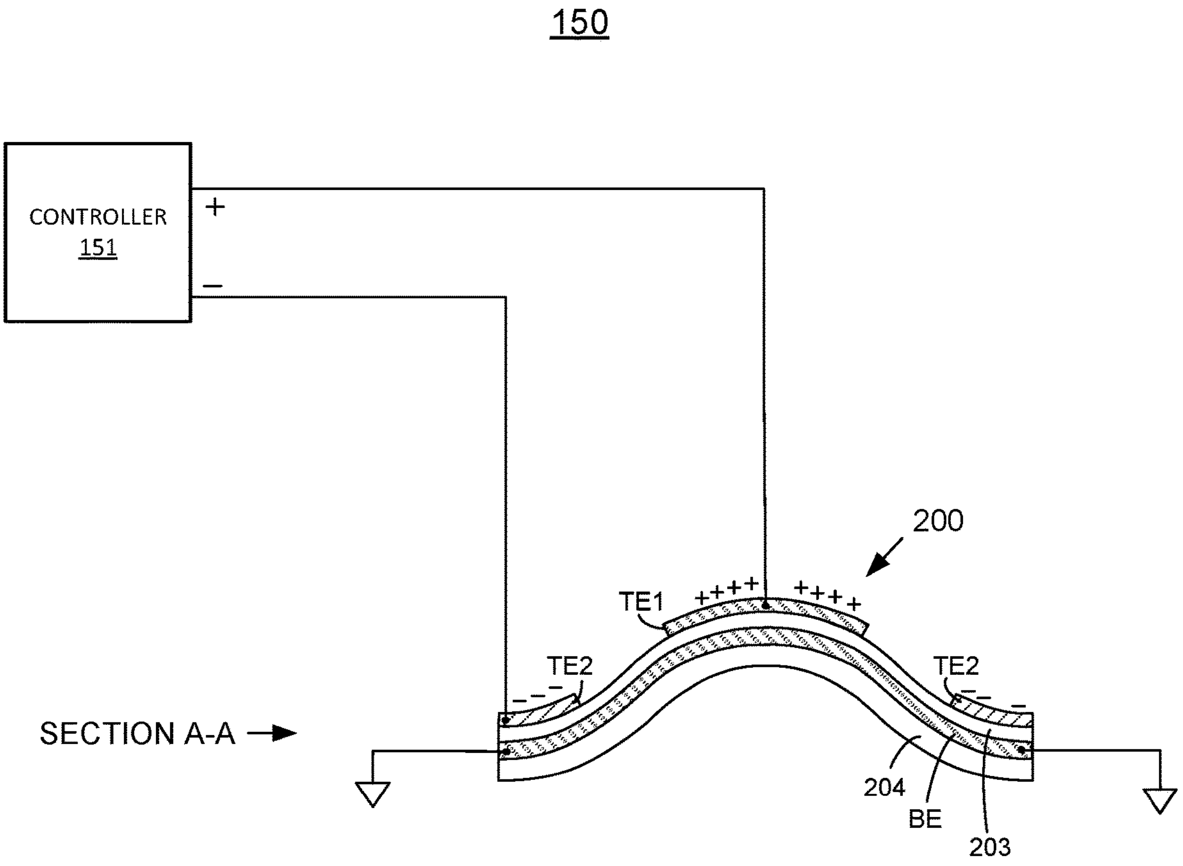
FIG. 3 illustrates a block diagram of differential ultrasonic transducer device, in accordance with various embodiments.

FIG. 3 illustrates operation of the differential PMUT 200 of FIGS. 2A and 2B in a transmit (Tx) mode, in accordance with various embodiments. In FIG. 3, a repeating waveform, such as a square wave or an approximation thereof, is output on the positive (non-inverting) output of controller 151, while and inverse repeating waveform (i.e., 180 degrees out of phase or within several degrees of being perfectly out of phase) is on the negative (inverting) output of controller 151. The positive output of controller 151 is coupled with center electrode TE1 of differential PMUT 200, while the negative output of controller 151 is coupled with the outer electrode TE2 of differential PMUT 200. In the depicted embodiments, bottom electrode BE is coupled with ground. In other embodiments, BE may be coupled with VSS which may be at ground, at zero volts, or at some other voltage such as a negative voltage. In yet other embodiments, bottom electrode BE may be patterned into BE1 and BE2 (neither depicted), with BE1 being opposite TE1 and BE2 being opposite TE2; in this configuration, BE1 & BE2 may be driven with the square wave corresponding to TE2 & TE1, respectively, that is, with the opposite phase of the square wave on the corresponding top electrode. These charge sharing techniques can be accomplished with a larger number of electrodes (than illustrated), which share charge when generally or perfectly out of phase.

Figure 4:
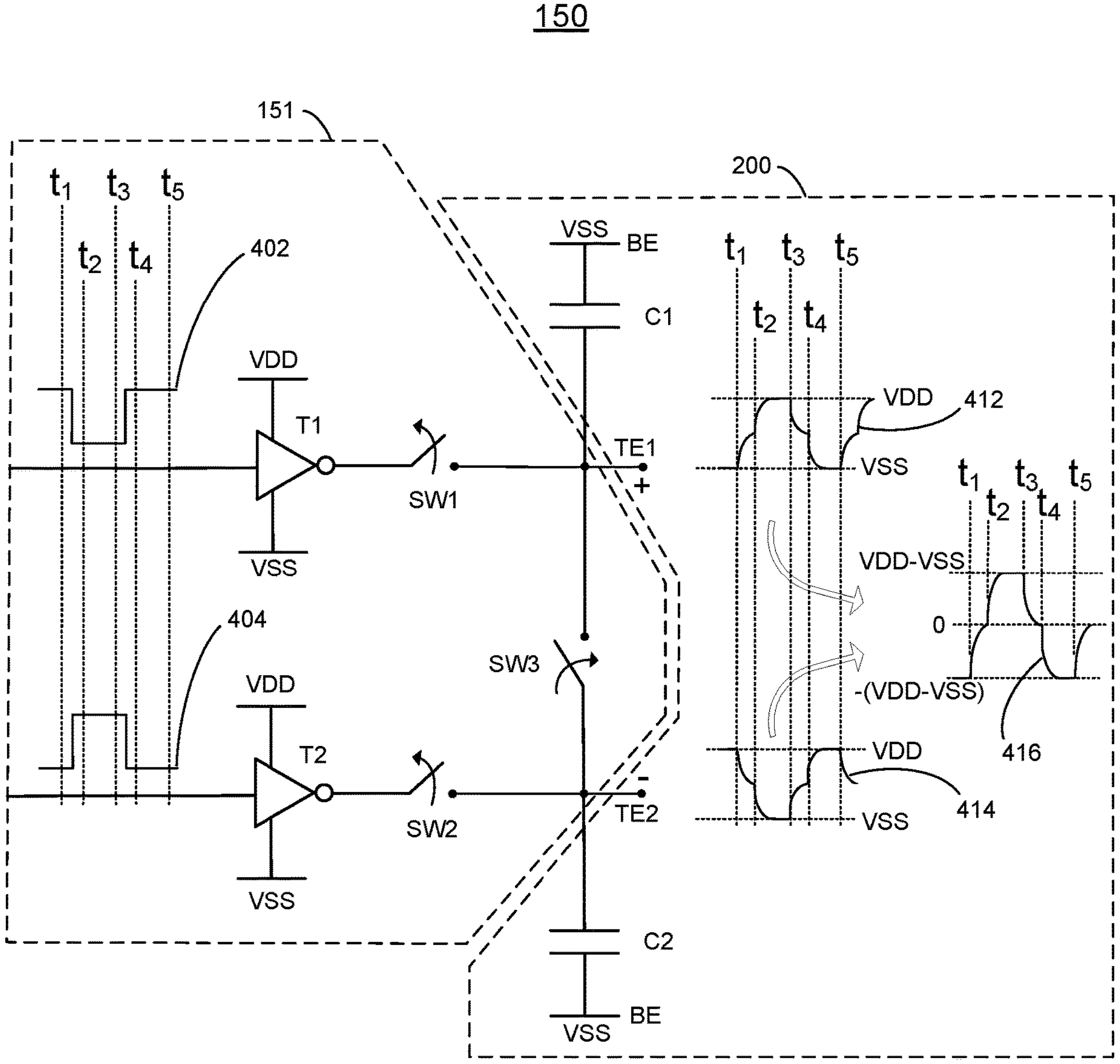
FIG. 4 illustrates an electrical diagram of some of the components of the ultrasonic transducer device of FIG. 3, in accordance with various embodiments.

FIG. 4 illustrates an electrical diagram of some of the components of the ultrasonic transducer device 200 of FIG. 3, in accordance with various embodiments. The positive (non-inverting) output of controller 151 includes a first driver T1 which is coupled through a first series switch SW1 to TE1 of differential transducer 200, and a negative (inverting) output of controller 151 includes a second inverter T2 which is coupled through a second series switch SW2 to TE2 of differential transducer 200. Controller 151 also includes a shunt switch, third switch SW3, which can electrically couple or decouple the non-inverting and inverting outputs of controller 151 and thus electrically couple/decouple electrodes TE1 and TE2. SW3 provides a selectively switchable electrical path between a first electrode (e.g., transmitter electrode TE1) and a second electrode (e.g., transmitter electrode TE2), where the selectively switchable electrical path is selectively opened and closed by the controller 151.

Drivers T1 and T2 are illustrated as invertors to represent that they are not linear amplifiers, but instead have two states as outputs: a high voltage (e.g., VDD); and a low voltage (VSS). Drivers T1 and T2 also have a high impedance state when their respective series switch (SW1, SW2) is in an open position. In some embodiments, driver T1 and series switch SW1 may be replaced with an inverter which has a tri-state output (high, low, and high impedance); likewise, driver T2 and series switch SW2 may be replaced with an inverter which has a tri-state output (high, low, and high impedance). In some embodiments, VDD may be between 10 and 30 volts, such as 20 volts. In some embodiments, VSS may simply be ground, while in others it may be a specific voltage such as zero volts or some negative voltage.

In some embodiments, a pulse generator (not depicted) may also be coupled with driver T1 and driver T2, to provide a repeating waveform (e.g., square wave 402 and square wave 404) as an input to each. Other suitable waveforms may be similarly used.

In some embodiments, a charge pump (not depicted) may also be coupled with driver T1 and driver T2, to provide charge. This may be a single charge pump for each driver or a shared charge pump. A charge pump, when included, supplies additional charge for drive transmitters (e.g., T1, T2) to level-shift the lower CMOS voltage levels (e.g., 0 to 5 volts) of the square wave which is input to each of the respective drive transmitters (e.g., T1, T2). In some embodiments, for example, a charge pump may be included when aluminum nitride (AlN) is used in the piezoelectric layer 203 as certain configurations of such a differential transducer may require additional supplied charge (voltage), over the voltage natively provided by drivers (T1, T2), to transmit.

The timing marks (t1, t2, t3, t4, and t5) on the input waveforms 402, 404, the drive waveforms 412 and 414, and the effective waveform 416 depict the implementation and effect of charge sharing between transmitter electrodes TE1 and TE2. At times t1, t3, and t5, switches SW1 and SW2 are open, while switch SW3 is closed to electrically couple transmitter electrodes TE1 and TE2 to facilitate sharing and equalize charge between them. At times t2 and t4, switches SW1 and SW2 are closed, while switch SW3 is opened to electrically decouple transmitter electrodes TE1 and TE2; during these times, the transmitter electrodes T1 and T2 are driven or discharged from their equalized states.

The timing of the opening and closing of series switches SW1 and SW2 and the shunt switch SW3 is used to share charge between the TE1 and TE2 transmitter electrodes. To begin, assume that TE1 is charged to VSS and TE2 is charged to VDD just prior to time t1. At time t1, logic of controller 151 operates to open SW1 and SW2 to disconnect transmitter electrodes TE1 and TE2 from output drivers T1 and T2, respectively; while at the same time or shortly thereafter logic of controller 151 then closes shunt switch SW3 to short transmitter electrodes TE1 and TE2 together. Transmitter electrode TE1 forms one plate of a first capacitor, while the other plate is formed by bottom electrode BE; similarly, transmitter electrode TE2 forms one plate of a second capacitor while the other plate is formed by BE. When the first and second capacitors are equal or nearly equal in value (as occurs with a differential drive arrangement), the voltage of the shorted TE1 and TE1 will stabilize to the average of VDD and VSS: ½ (VDD+VSS). The charge exchange between the first and second capacitors is charge that will not have to come from the supply (e.g., it will not have to come from controller 151) during the next phase of the operation. In a case where the first capacitor and the second capacitor are equal, this charge is: C(VDD-½ (VDD+VSS)).

During the next timing phase, beginning at time t2, logic of controller 151 opens the shunt switch SW3 and simultaneously or shortly thereafter closes the series switches SW1 and SW2. This results in transmitter electrode TE1 being driven the rest of the way from its equalized state to VDD by transmitter T1, and transmitter electrode TE2 being driven the rest of the way from its equalized state to VSS by transmitter T2.

At time t3, logic of controller 151 operates to open SW1 and SW2 to disconnect transmitter electrodes TE1 and TE2 from output drivers T1 and T2, respectively; while at the same time or shortly thereafter logic of controller 151 then closes shunt switch SW3 to short transmitter electrodes TE1 and TE2 together. As previously described, transmitter electrode TE1 forms one plate of a first capacitor, while the other plate is formed by bottom electrode BE; similarly, transmitter electrode TE2 forms one plate of a second capacitor while the other plate is formed by BE. When the first and second capacitors are equal or nearly equal in value (as occurs with a differential drive arrangement), the voltage of the shorted TE1 and TE1 will stabilize to the average of VDD and VSS: ½ (VDD+VSS). The charge exchange between the first and second capacitors is charge that will not have to come from the supply (e.g., it will not have to come from controller 151) during the next phase of the operation. In a case where the first capacitor and the second capacitor are equal, this charge is: C(VDD−½ (VDD+VSS)).

During the next timing phase, beginning at time t4, logic of controller 151 opens the shunt switch SW3 and simultaneously or shortly thereafter closes the series switches SW1 and SW2. This results in transmitter electrode TE1 being driven the rest of the way from its equalized state to VSS by driver T1, and transmitter electrode TE2 being driven the rest of the way from its equalized state to VDD by driver T2.

At time t5, the process repeats with the actions at time t5 being the same as the actions as at time t1.

In the Tx mode illustrated in FIG. 3, through a combination of driving and charge sharing, differential (e.g., 180 degrees out-of-phase) drive signals 412 and 414 are provided at the non-inverting output (e.g., the +output) and inverting output (e.g., the inverting output) of controller 151, respectively. By driving these differential signals 412 and 414 simultaneously on both the center electrode TE1 and the outer electrode TE2, respectively, the achieved displacement of the differential electrode PMUT 200 is increased compared to driving only on the either the center electrode TE1 or on outer electrode TE2. Because TE1 and TE2 are driven with the same waveform, but 180 degrees out of phase, the effective waveform 416 is twice as big as either of the separate drive waveforms 412 or 414. The increased displacement results in increased transmission range of the transmitted ultrasonic signal over conventional approaches.

In a conventional differential drive technique (absent charge sharing), the charge required from the VDD supply is C(VDD-VSS). However, in the charge sharing differential drive technique of FIG. 4, the charge sharing event has already supplied C*VDD−½ (VDD+VSS) charge. Thus, the required charge from the VDD supply is then the difference between those two quantities, or ½C*(VDD−VSS); which is half or approximately half the charge which would be needed without charge sharing. Similarly, the power consumption is then ½ $C^*(VDD-VSS)^2$. The total power consumption for the two output drivers T1 and T2 is thus: ½ (CP1+CP2)(VDD−VSS)(2FOP), where FOP is the frequency of operation. As illustrated by effective waveform 416, the output power experienced between the transmitter electrodes TE1 and TE2 of a differential ultrasonic transducer 200 is between VDD−VSS at upper peak top of waveform 416 and −1*(VDD−VSS) at the lower peak of waveform 416. As can be seen, compared to a conventional differential drive technique (without charge sharing), the described differential drive technique with charge sharing saves a factor of two in power consumption or, put differently, provides nearly double the ultrasonic output for the same power consumption as an ultrasonic transducer operated without the techniques for charge sharing described herein. This savings permits smaller drive components (e.g., smaller transistors, smaller capacitors, smaller charge pumps, smaller drivers, etc.) in a circuit, such as an ASIC, which forms controller 151. Smaller sizes of these drive components consequently save area on in the circuitry and allow all, or nearly all, of the circuitry of controller 151 to be on-chip. This also facilitates controller 151 driving a differential transducer with larger capacitances (e.g., the first capacitor and second capacitor described previously) via the charge sharing technique, than would be achievable by controller 151 using a conventional drive scheme.

Example Method of Operation

FIG. 5 illustrates a method of operating a differential piezoelectric micromachined ultrasonic transducer comprising a first electrode with a positive voltage to displacement coefficient and a second electrode with a negative voltage to displacement coefficient, in accordance with various embodiments. In some embodiments, the differential piezoelectric micromachined transducer may operate in the ultrasonic range and it may be referred to as a PMUT. In some embodiments the piezoelectric micromachined transducer is air coupled. Procedures of the method illustrated by flow diagram 500 of FIGS. 5A-5D will be described with reference to elements and/or components of one or more of FIGS. 2A, 2B, 3, and 4. It is appreciated that in some embodiments, the procedures may be performed in a different order than described in a flow diagram, that some of the described procedures may not be performed, and/or that one or more additional procedures to those described may be performed. Flow diagram 500 includes some procedures that, in various embodiments, are carried out by one or more processors/controllers (e.g., host processor 110, controller 151, or the like) under the control of computer-readable and computer-executable instructions that are stored on non-transitory computer-readable storage media (e.g., host memory 111 or memory/logic of an ASIC). It is further appreciated that one or more procedures described in flow diagram 500 may be implemented in hardware, or a combination of hardware with firmware and/or software.

Five time periods (t1, t2, t3, t4, and t5) are described in flow diagram 500. Prior to the first time period, t1, a first electrode (e.g., transmitter electrode TE1) of a differential ultrasonic transducer 200 is charged to VSS and a second electrode (e.g., transmitter electrode TE2) of the differential ultrasonic transducer 200 is charged to VDD.

Figure 5A:
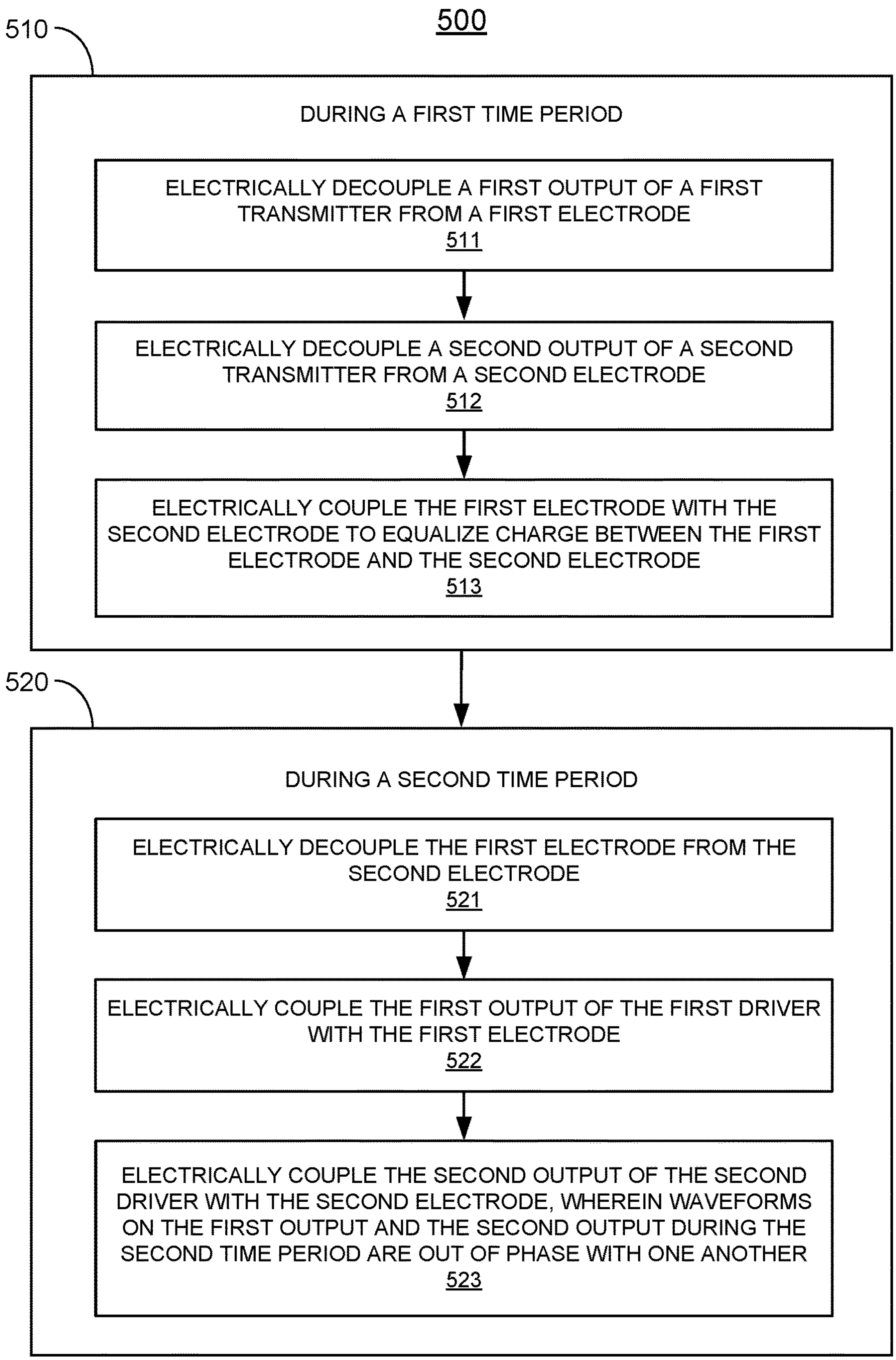
FIGS. 5A-5D illustrate a method of operating a differential piezoelectric micromachined ultrasonic transducer comprising a first electrode with a positive voltage to displacement coefficient and a second electrode with a negative voltage to displacement coefficient, in accordance with various embodiments.

With reference to FIG. 5A, at procedure 510 of flow diagram 500, in various embodiments, a first time period starts during which certain activities take place with respect to controller 151 and differential ultrasonic transducer 200. With reference to FIG. 4, this first time is represented by time t1.

With continued reference to FIG. 5A, at procedure 511 of flow diagram 500, in various embodiments, a first output of a first driver is electrically decoupled from the first electrode. Referring to time t1 in FIG. 4, in some embodiments, this may comprise controller 151 opening series switch SW1 to decouple the non-inverting output of driver T1 from transmitter electrode TE1 (i.e., the center electrode) of differential ultrasonic transducer 200.

With continued reference to FIG. 5A, at procedure 512 of flow diagram 500, in various embodiments, a second output of a second driver is electrically decoupled from the second electrode. Referring to time t1 in FIG. 4, in some embodiments, this may comprise controller 151 opening series switch SW2 to decouple the inverting output of driver T2 from transmitter electrode TE2 (i.e., the outer electrode) of differential ultrasonic transducer 200.

With continued reference to FIG. 5A, at procedure 513 of flow diagram 500, in various embodiments, the first electrode and the second electrode are electrically coupled with one another to equalize charge between the first electrode and the second electrode. Referring to time t1 in FIG. 4, in some embodiments, this may comprise controller 151 closing shunt switch SW3 to couple the transmitter electrodes TE1 and TE2, thus permitting voltage and charge to equalize across them. The equalization results in each of electrodes TE1 and TE2 achieving a state about midway between VDD and VSS, without requiring any additional input of voltage or charge from controller 151.

With continued reference to FIG. 5A, at procedure 520 of flow diagram 500, in various embodiments, a second time period starts during which certain activities take place with respect to controller 151 and differential ultrasonic transducer 200. With reference to FIG. 4, this second time is represented by time t2.

With continued reference to FIG. 5A, at procedure 521 of flow diagram 500, in various embodiments, the first electrode is electrically decoupled from the second electrode. Referring to time t2 in FIG. 4, this may comprise controller 151 opening shunt switch SW3 to decouple the transmitter electrodes TE1 and TE2 from one another, thus leaving them both in the equalized state achieved by procedure 513.

With continued reference to FIG. 5A, at procedure 522 of flow diagram 500, in various embodiments, the first output of the first driver is electrically coupled with the first electrode. Referring to time t2 in FIG. 4, in some embodiments, this may comprise controller 151 closing series switch SW1 to electrically couple the non-inverting output of driver T1 with transmitter electrode TE1 of differential ultrasonic transducer 200. With shunt switch SW3 open, closing series switch SW1 results in transmitter electrode TE1 being driven the rest of the way from its equalized state to VDD by transmitter T1.

With continued reference to FIG. 5A, at procedure 523 of flow diagram 500, in various embodiments, electrically coupling the second output of the second driver with the second electrode, wherein waveforms on the first output and the second output during the second time period are out of phase with one another. Referring to time t2 in FIG. 4, in some embodiments, this may comprise controller 151 closing series switch SW2 to electrically couple the inverting output of driver T2 with transmitter electrode TE2 of differential ultrasonic transducer 200. With shunt switch SW3 open, closing series switch SW2 results in transmitter electrode TE2 being driven the rest of the way from its equalized state to VSS by transmitter T1. With reference to t2 in FIG. 4, waveforms 402 and 404 are 180 degrees out of phase with one another; likewise waveforms 412 and 414 (on the first output (+) and the second output (−) are 180 degrees out of phase with one another. It should be appreciated that, in some embodiments, waveforms on the first and second outputs may not be exactly 180 degrees out of phase. For example, they may be within a few to several degrees of being 180 degrees out of phase due to slight timing differences between opening and closing of switches and/or due to manufacturing tolerance variances between components.

Put differently, the equalization of charge during the first time period reduces, during the second time period, an amount of charge required from the first driver and from the second driver to operate the ultrasonic transducer device. That is, the equalization took each of TE1 and TE2 was about halfway to then next state it was going to be driven toward, thus reducing the amount of charged required from the first driver T1 to drive electrode TE1 the rest of the way to its next state and also reducing the amount of charge required from the second driver T2 to drive electrode TE2 the rest of the way to its next state.

As can be seen from the timing diagrams in FIG. 4, waveforms 402 and 404 are 180 degrees out of phase with one another at time t2; likewise, waveforms 412 and 414 are 180 degrees out of phase with one another at time t2.

Figure 5B:
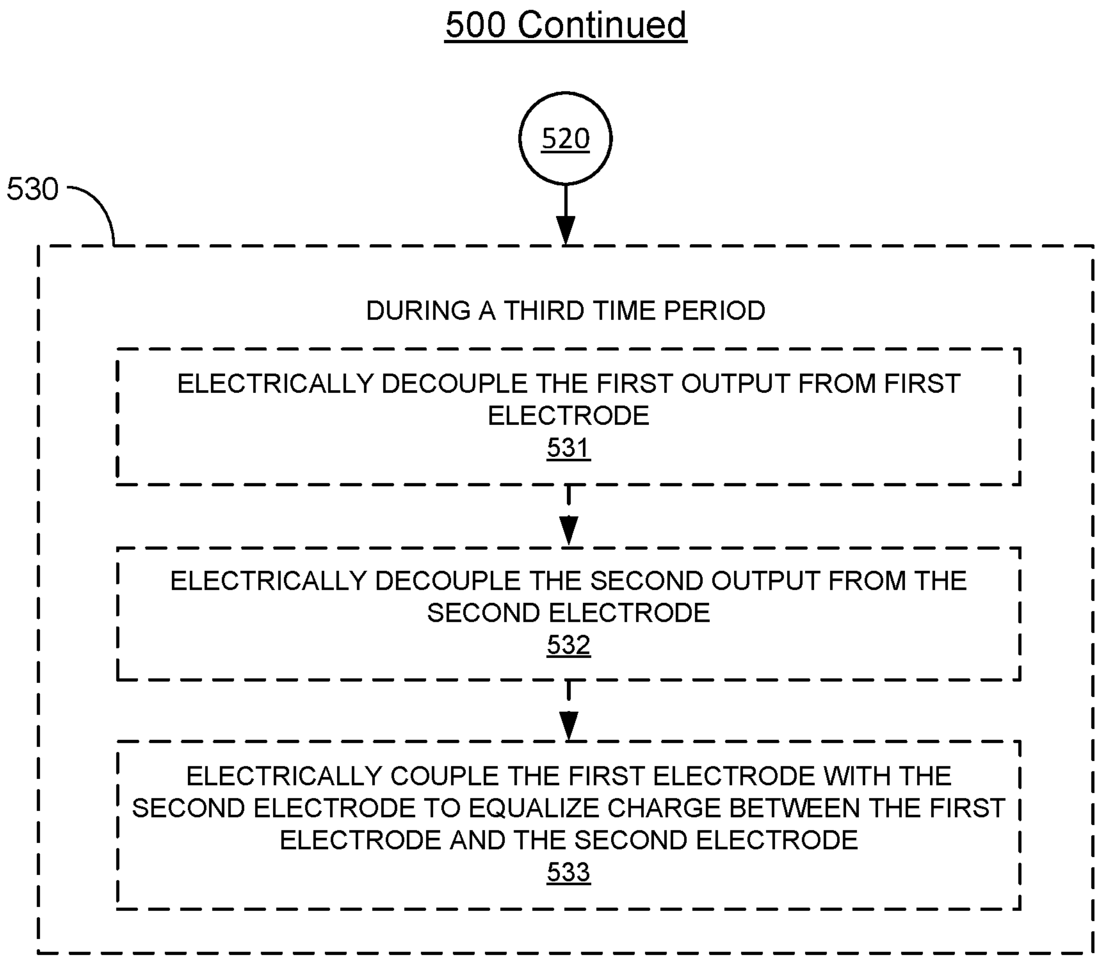

Referring now to FIG. 5B, at procedure 530 of flow diagram 500, in various embodiments, a first third period starts during which certain activities take place with respect to controller 151 and differential ultrasonic transducer 200. With reference to FIG. 4, this third time is represented by time t3.

With continued reference to FIG. 5B, at procedure 531 of flow diagram 500, in various embodiments, the first output of the first driver is electrically decoupled from the first electrode. Referring to time t3 in FIG. 4, in some embodiments, this may comprise controller 151 opening series switch SW1 to decouple the non-inverting output of driver T1 from transmitter electrode TE1 (i.e., the center electrode) of differential ultrasonic transducer 200.

With continued reference to FIG. 5B, at procedure 532 of flow diagram 500, in various embodiments, the second output of the second driver is electrically decoupled from the second electrode. Referring to time t3 in FIG. 4, in some embodiments, this may comprise controller 151 opening series switch SW2 to decouple the inverting output of driver T2 from transmitter electrode TE2 (i.e., the outer electrode) of differential ultrasonic transducer 200.

With continued reference to FIG. 5B, at procedure 533 of flow diagram 500, in various embodiments, the first electrode and the second electrode are electrically coupled with one another to equalize charge between the first electrode and the second electrode. Referring to time t3 in FIG. 4, in some embodiments, this may comprise controller 151 closing shunt switch SW3 to couple the transmitter electrodes TE1 and TE2, thus permitting voltage and charge to equalize across them. The equalization results in each of electrodes TE1 and TE2 achieving a state about midway between VDD and VSS, without requiring any additional input of voltage or charge from controller 151.

Figure 5C:
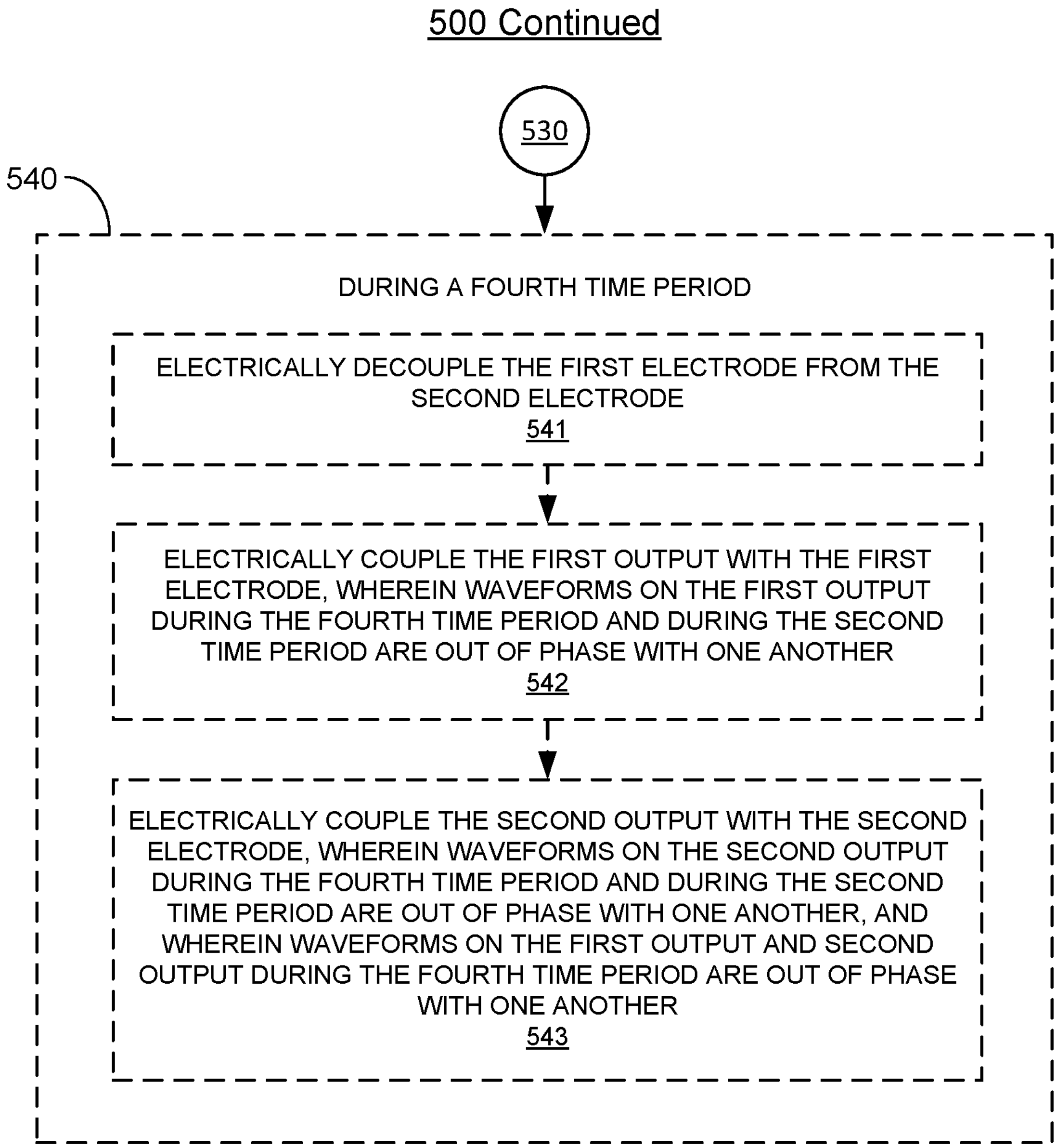

Referring now to FIG. 5C, at procedure 540 of flow diagram 500, in various embodiments, a fourth time period starts during which certain activities take place with respect to controller 151 and differential ultrasonic transducer 200. With reference to FIG. 4, this fourth time is represented by time t4.

With continued reference to FIG. 5C, at procedure 541 of flow diagram 500, in various embodiments, the first electrode is electrically decoupled from the second electrode. Referring to time t4 in FIG. 4, this may comprise controller 151 opening shunt switch SW3 to decouple the transmitter electrodes TE1 and TE2 from one another, thus leaving them both in the equalized state achieved by procedure 533.

With continued reference to FIG. 5C, at procedure 542 of flow diagram 500, in various embodiments, the first output of the first driver is electrically coupled with the first electrode. Waveforms on the first output during the fourth time period and during the second time period are out of phase with one another. Referring to time t4 in FIG. 4, in some embodiments, this may comprise controller 151 closing series switch SW1 to electrically couple the non-inverting output of driver T1 with transmitter electrode TE1 of differential ultrasonic transducer 200. With shunt switch SW3 open, closing series switch SW1 results in transmitter electrode TE1 being driven the rest of the way from the equalized state to VSS by transmitter T1. With reference to FIG. 4 and waveform 412, in some embodiments, during time periods t4 and t2 waveform 412 is 180 degrees out of phase, or nearly so (e.g., within a few to several degrees).

With continued reference to FIG. 5C, at procedure 543 of flow diagram 500, in various embodiments, electrically coupling the second output of the second driver with the second electrode, wherein waveforms on the first output and the second output are out of phase with one another. Referring to time t4 in FIG. 4, in some embodiments, this may comprise controller 151 closing series switch SW2 to electrically couple the inverting output of driver T2 with transmitter electrode TE2 of differential ultrasonic transducer 200. With shunt switch SW3 open, closing series switch SW2 results in transmitter electrode TE2 being driven the rest of the way from the equalized state to VDD by transmitter T1. As can be seen from the timing diagrams in FIG. 4, waveforms 402 and 404 are 180 degrees out of phase with one another at time t4, or nearly so (e.g., within a few to several degrees); likewise, waveforms 412 and 414 are 180 degrees out of phase with one another at time t4, or nearly so (e.g., within a few to several degrees).

Figure 5D:
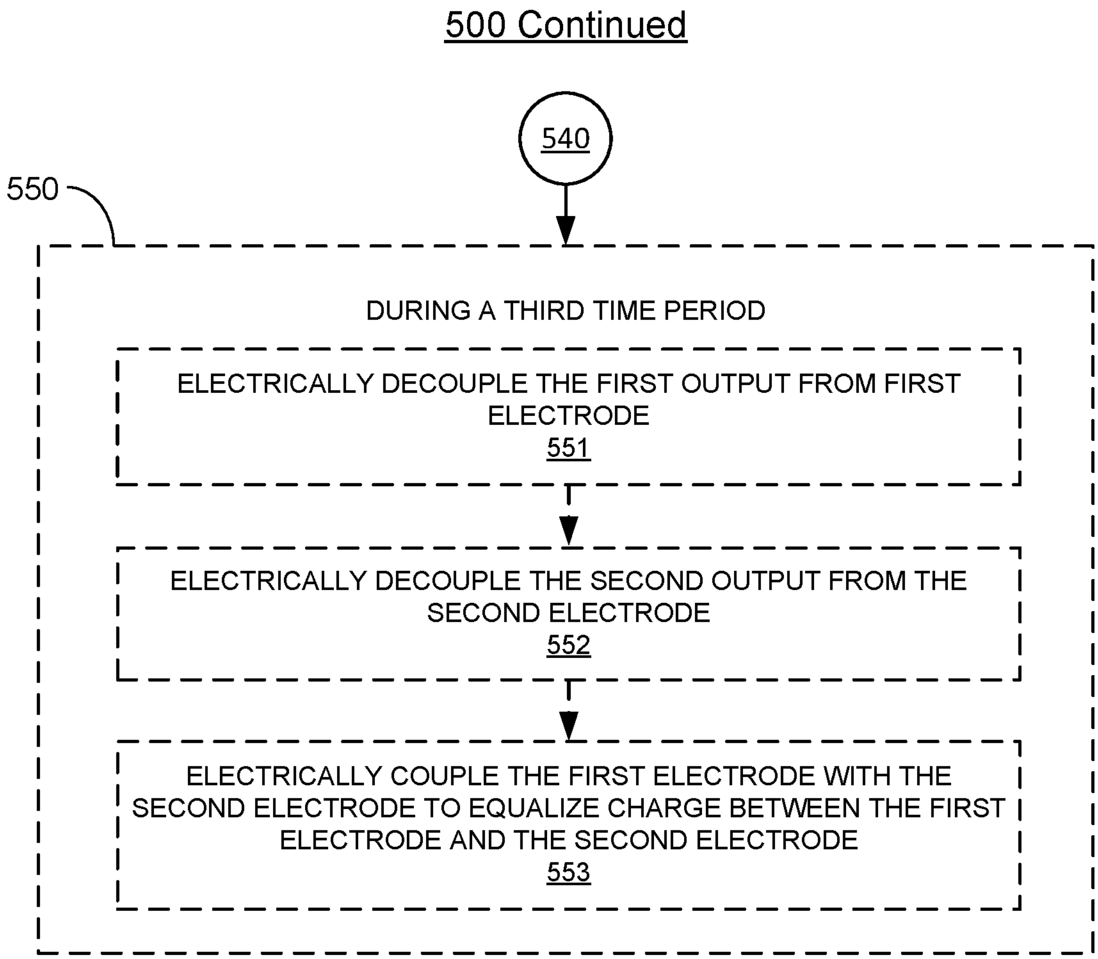

Referring now to FIG. 5D, at procedure 550 of flow diagram 500, in various embodiments, a fifth time period starts during which certain activities take place with respect to controller 151 and differential ultrasonic transducer 200. With reference to FIG. 4, this fifth time is represented by time t5.

With continued reference to FIG. 5D, at procedure 551 of flow diagram 500, in various embodiments, the first output of the first driver is electrically decoupled from the first electrode. Referring to time t5 in FIG. 4, in some embodiments, this may comprise controller 151 opening series switch SW1 to decouple the non-inverting output of driver T1 from transmitter electrode TE1 (i.e., the center electrode) of differential ultrasonic transducer 200.

With continued reference to FIG. 5D, at procedure 552 of flow diagram 500, in various embodiments, the second output of the second driver is electrically decoupled from the second electrode. Referring to time t5 in FIG. 4, in some embodiments, this may comprise controller 151 opening series switch SW2 to decouple the inverting output of driver T2 from transmitter electrode TE2 (i.e., the outer electrode) of differential ultrasonic transducer 200.

With continued reference to FIG. 5D, at procedure 553 of flow diagram 500, in various embodiments, the first electrode and the second electrode are electrically coupled with one another to equalize charge between the first electrode and the second electrode. Referring to time t5 in FIG. 4, in some embodiments, this may comprise controller 151 closing shunt switch SW3 to couple the transmitter electrodes TE1 and TE2, thus permitting voltage and charge to equalize across them. The equalization results in each of electrodes TE1 and TE2 achieving a state about midway between VDD and VSS, without requiring any additional input of voltage or charge from controller 151.

CONCLUSION

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. An ultrasonic transducer device comprising:
- a differential piezoelectric micromachined ultrasonic transducer comprising:
  - a membrane layer;
  - a bottom electrode layer disposed above and coupled with the membrane layer;
  - a piezoelectric layer disposed above and coupled with the bottom electrode layer; and
  - a top electrode layer disposed above and coupled with the piezoelectric layer and comprising:
    - a first electrode with a positive voltage to displacement coefficient; and
    - a second electrode with a negative voltage to displacement coefficient; and
- a controller configured to:
  - during a first time period:
    - electrically decouple a first output of a first driver from the first electrode; and
    - electrically decouple a second output of a second driver from the second electrode; and
    - electrically couple the first electrode with the second electrode to equalize charge between the first electrode and the second electrode; and
  - during a second time period:
    - electrically decouple the first electrode from the second electrode;
    - electrically couple the first output of the first driver with the first electrode; and
    - electrically couple the second output of the second driver with the second electrode, wherein waveforms on the first output and the second output during the second time period are out of phase with one another.

2. The ultrasonic transducer device of claim 1, further comprising:
- a selectively switchable electrical path between the first electrode and the second electrode, wherein the selectively switchable electrical path is configured to be selectively opened and closed by the controller.

3. The ultrasonic transducer device of claim 1, wherein the controller further comprises:
- the first driver; and
- the second driver.

4. The ultrasonic transducer device of claim 1, wherein the controller is further configured to:
- during a third time period:
  - electrically decouple the first output from the first electrode;
  - electrically decouple the second output from the second electrode; and
  - electrically couple the first electrode with the second electrode to equalize charge between the first electrode and the second electrode; and
- during a fourth time period:
  - electrically decouple the first electrode from the second electrode;
  - electrically couple the first output with the first electrode, wherein waveforms on the first output during the third time period and during the first time period are out of phase with one another; and
  - electrically couple the second output with the second electrode, wherein waveforms on the second output during the second time period and during the fourth time period are out of phase with one another, and wherein waveforms on the first output and second output during the fourth time period are out of phase with one another.

5. The ultrasonic transducer device of claim 1, wherein the equalization of charge during the first time period reduces, during the second time period, an amount of charge required from the first driver and from the second driver to operate the ultrasonic transducer device.

6. The ultrasonic transducer device of claim 1, wherein the first output and second output are differential with respect to one another.

7. The ultrasonic transducer device of claim 1, wherein the first electrode forms a plate of a first capacitor and the second electrode forms a plate of a second capacitor, and wherein the equalization of charge between the first electrode and the second electrode comprises an equalization of charge between the first capacitor and the second capacitor.

8. The ultrasonic transducer device of claim 1, wherein the first electrode and the second electrode are substantially equal to one another in surface area.

9. The ultrasonic transducer device of claim 1, wherein the first electrode and the second electrode are parts of a common electrode layer, and wherein:

the first electrode is a center electrode of the top electrode layer and is disposed above a center portion of the membrane layer; and the second electrode is an outer electrode of the top electrode layer and is spaced outwardly apart from the center electrode.

10. A controller for a differential piezoelectric micromachined ultrasonic transducer, the controller comprising:

a first driver with a first output;

a second driver with a second output which is out of phase with the first output; and control logic disposed in the controller and configured to:

during a first time period:

electrically decouple the first output from a first electrode of the differential piezoelectric micromachined ultrasonic transducer of an ultrasonic transducer, wherein the first electrode has a positive voltage to displacement coefficient;

electrically decouple the second output from a second electrode of the differential piezoelectric micromachined ultrasonic transducer, wherein the second electrode has a negative voltage to displacement coefficient; and electrically couple the first electrode with the second electrode to equalize charge between the first electrode and the second electrode; and during a second time period:

electrically decouple the first electrode from the second electrode;

electrically couple the first output of the first driver with the first electrode; and electrically couple the second output of the second driver with the second electrode, wherein waveforms on the first output and the second output during the second time period are out of phase with one another.

11. The controller of claim 10, further comprising:

a selectively switchable electrical path between the first electrode and the second electrode.

12. The controller of claim 10, wherein the controller is further configured to:

during a third time period:

electrically decouple the first output from the first electrode;

electrically decouple the second output from the second electrode; and electrically couple the first electrode with the second electrode to equalize charge between the first electrode and the second electrode; and during a fourth time period:

electrically decouple the first electrode from the second electrode;

electrically couple the first output with the first electrode, wherein waveforms on the first output during the third time period and during the first time period are out of phase with one another; and electrically couple the second output with the second electrode, wherein waveforms on the second output during the second time period and during the fourth time period are out of phase with one another, and wherein waveforms on the first output and second output during the fourth time period are out of phase with one another.

13. The controller of claim 10, wherein the equalization of charge during the first time period reduces, during the second time period, an amount of charge required from the first driver and from the second driver to operate the ultrasonic transducer.

14. The controller of claim 10, wherein the first output and second output are differential with respect to one another.

15. The controller of claim 10, wherein the first electrode forms a plate of a first capacitor and the second electrode forms a plate of a second capacitor, and wherein the equalization of charge between the first electrode and the second electrode comprises an equalization of charge between the first capacitor and the second capacitor.

16. A method of operating a differential piezoelectric micromachined ultrasonic transducer comprising a first electrode with a positive voltage to displacement coefficient and a second electrode with a negative voltage to displacement coefficient, the method comprising:

during a first time period:

electrically decoupling a first output of a first driver from the first electrode; and electrically decoupling a second output of a second driver from the second electrode; and electrically coupling the first electrode with the second electrode to equalize charge between the first electrode and the second electrode; and during a second time period:

electrically decoupling the first electrode from the second electrode;

electrically coupling the first output of the first driver with the first electrode; and electrically coupling the second output of the second driver with the second electrode, wherein waveforms on the first output and the second output during the second time period are out of phase with one another.

17. The method as recited in claim 16, further comprising:

during a third time period:

electrically decoupling the first output from the first electrode;

electrically decoupling the second output from the second electrode; and electrically coupling the first electrode with the second electrode to equalize charge between the first electrode and the second electrode.

18. The method as recited in claim 17, further comprising:

during a fourth time period:

electrically decoupling the first electrode from the second electrode;

electrically coupling the first output with the first electrode, wherein waveforms on the first output during the third time period and during the first time period are out of phase with one another; and electrically coupling the second output with the second electrode, wherein waveforms on the second output during the second time period and during the fourth time period are out of phase with one another, and wherein waveforms on the first output and second output during the fourth time period are out of phase with one another.

19. The method as recited in claim 18, further comprising: during a fifth time period:

electrically decoupling a first output of a first driver from the first electrode; and electrically decoupling a second output of a second driver from the second electrode; and electrically coupling the first electrode with the second electrode to equalize charge between the first electrode and the second electrode.

20. The method as recited in claim 16, wherein the electrically decoupling the first electrode from the second electrode comprises:

opening a selectively switchable electrical path between the first electrode and the second electrode.

21. The method as recited in claim 16, wherein the electrically coupling the first electrode with the second electrode to equalize charge between the first electrode and the second electrode comprises:

closing a selectively switchable electrical path between the first electrode and the second electrode.

* * * * *